United States Patent
Landahl et al.

[11] Patent Number: 5,873,775
[45] Date of Patent: Feb. 23, 1999

[54] METHOD AND APPARATUS FOR SEPARATING COMPONENTS HAVING DIFFERENT VISCOSITIES AND/OR SIZES FROM A COMPOSITION

[76] Inventors: Siegfried Landahl, 5622 S. 235th St., Apt. No. 66101, Kent, Wash. 98032; Klaus Reinke, Püttenhorst 117, D-21035 Hamburg, Germany; Michael Wulff, 13615 Eagle Ridge Dr., Apt. No. 1836, Fort Myers, Fla. 33912

[21] Appl. No.: 966,078

[22] Filed: Nov. 7, 1997

[30]       Foreign Application Priority Data

Nov. 8, 1996 [DE] Germany .................. 296 19 439 U
Oct. 7, 1997 [DE] Germany .................. 197 44 305.2

[51] Int. Cl.⁶ .................................................. A22C 17/04
[52] U.S. Cl. ............................................................ 452/138
[58] Field of Search ............................................... 452/138

[56]                 References Cited

U.S. PATENT DOCUMENTS

| 3,552,461 | 1/1971 | Paoli . | |
| 3,829,931 | 8/1974 | Suerbaum | 452/138 |
| 4,637,094 | 1/1987 | Matsubayashi | 452/138 |
| 4,899,890 | 2/1990 | Ewing et al. | 452/138 |
| 5,507,689 | 4/1996 | McFarland et al. | 452/138 |

FOREIGN PATENT DOCUMENTS

| 0 307 648 | 3/1989 | European Pat. Off. . | |
| 0 375 877 | 7/1990 | European Pat. Off. . | |
| 24 08 321 | 9/1975 | Germany . | |
| 39 34 087 | 2/1991 | Germany . | |
| 42 12 927 | 10/1993 | Germany . | |
| 2093331 | 9/1982 | United Kingdom | 452/138 |

*Primary Examiner*—Willis Little
*Attorney, Agent, or Firm*—Knobbe, Martens, Olson & Bear, LLP

[57]                   ABSTRACT

A method and an apparatus for separating components having different viscosities and/or sizes from a composition are disclosed The apparatus comprises a rotatable hollow drum having an outer surface which is perforated, and an endless belt in engagement with a portion of the outer surface of said drum. The belt and said outer surface define an input zone where the belt and the outer surface engage. The input zone has the form of a wedge, and in use, the belt rotates synchronously with the outer surface. The apparatus further comprises an adjustable compression roller positioned to press the belt against said portion of the outer surface of the hollow drum, and a device positioned within the input zone. The device tends to urge the compression belt away from the outer surface. The apparatus has an improved input capability, particularly for bulky material.

27 Claims, 5 Drawing Sheets

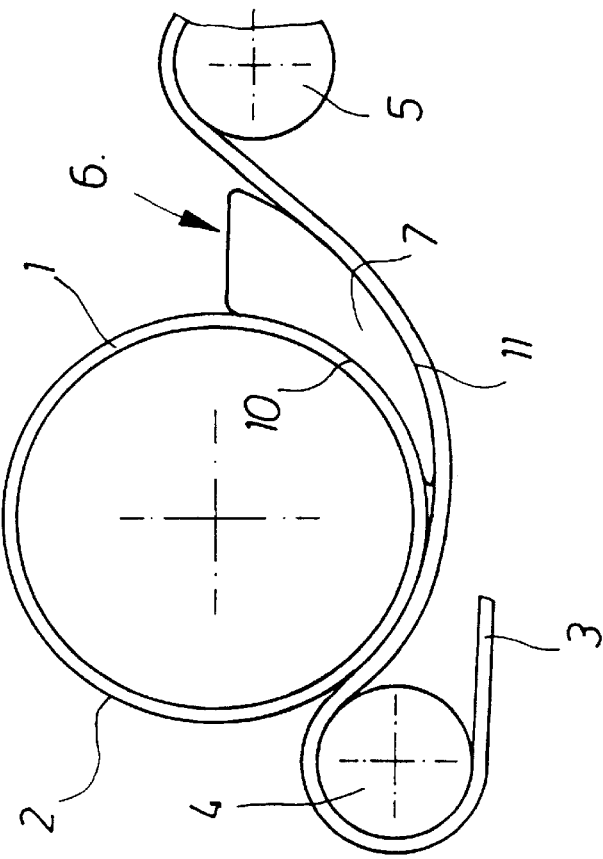
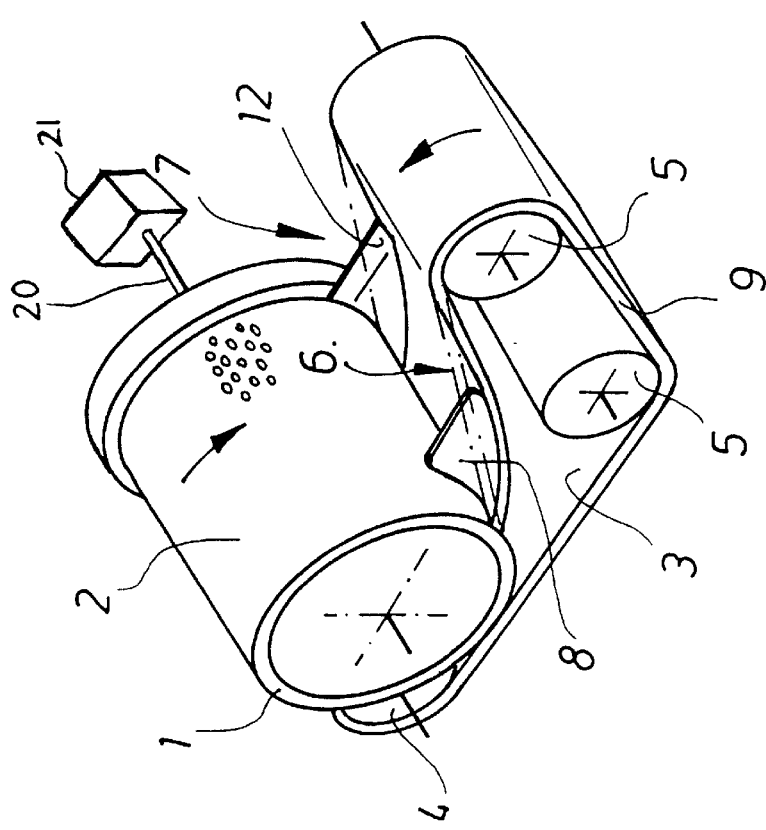
Fig. 2
Fig. 1

METHOD AND APPARATUS FOR SEPARATING COMPONENTS HAVING DIFFERENT VISCOSITIES AND/OR SIZES FROM A COMPOSITION

BACKGROUND OF THE INVENTION

1. Field of the Invention

The present invention relates to a food processing apparatus, and more particularly to a method and an apparatus for separating components having different viscosities and/or sizes from a composition. The composition is preferably a food product or a food product and food product container.

2. Description of Related Art

A separating apparatus is generally used in the food industry, e.g., to chop meat and remove skins and sinews, to produce skin and bone free fish stuffing from fish fillets remnants or fish bone remnants, to produce fruit and vegetables juices, to recycle contents of packages, and the like.

German patent number 43 28 627 and corresponding U.S. Pat. No. 5,507,689 disclose an apparatus for separating components having different viscosities and/or sizes from a composition. The disclosed apparatus comprises a hollow, rotatable drum with a perforated outer surface, and an endless compression belt engaging a portion of the outer surface. The compression belt forms with the outer surface a wedge-shaped input zone, and rotates synchronously with the outer surface. The apparatus further comprises adjustable compression means to press the compression belt against the drum.

During operation of such an apparatus, goods to be processed are fed to the input zone where they are pulled in between the outer surface of the hollow drum and the compression belt, whereby the more viscous components flow through the perforations of the hollow drum into the interior under the influence of the compression, and the less viscous components remain at the periphery of the hollow drum, pass between the drum and the compression belt and are ejected from the belt beyond the drum, preferably by scraping with a scraping device.

German patent number 2 159 465 discloses a straining machine having in the area where the compression belt engages the hollow drum supporting means which support the compression belt from below to press against the belt to increase its engagement with the drum.

During processing of bulky goods, e.g., during automatic opening of food packages made of plastic or cellulose, the goods to be processed often cannot be pulled in because of their bulkiness. As experienced in practice, in most cases this effect cannot be reliably avoided by pre-chopping the goods to be processed. A pre-chopping apparatus is known from German utility model number 89 11 890.1. This reference discloses an unit which is positioned above the input zone and comprises rotating knives to chop the goods.

Generally, said effect cannot be overcome by using stuffing devices, e.g., known from European Patent number 375 877 or Canadian Patent number 965 297, which, inter alia, disclose a reciprocating ram element that periodically extends into the input zone.

In view of the deficiencies associated with processing goods in the prior art, there exists a need to improve the processing capabilities of separating apparatuses.

SUMMARY OF THE INVENTION

In accordance with an aspect of the present invention an apparatus for separating components having different viscosities and/or sizes from a composition is provided. Said apparatus comprises a rotatable hollow drum having an outer surface which is perforated, and an endless belt in engagement with a portion of the outer surface of said drum. The belt and said outer surface define an input zone where the belt and the outer surface engage. The input zone has the form of a wedge. The apparatus further comprises an adjustable compression roller positioned to press the belt against said portion of the outer surface of the hollow drum, and a device positioned within the input zone. The device tends to urge the compression belt away from the outer surface.

A further aspect of the present invention involves an apparatus for separating components having different viscosities and/or sizes from a composition, which apparatus comprises a rotatable hollow drum having an outer surface which is perforated, an endless belt in engagement with a portion of the outer surface of said drum, and an unit for supplying the composition. The belt and said outer surface define an input zone where the belt and the outer surface engage. The input zone has the form of a wedge, and in use, the belt rotates synchronously with the outer surface. The apparatus further comprises an adjustable compression roller positioned to press the belt against said portion of the outer surface of the hollow drum. The supply unit comprises a housing which extends into the area where the belt and the hollow drum engage. The housing having walls defining an opening directed towards said area.

An additional aspect of the present invention involves a method for separating components having different viscosities and/or sizes from a composition. The method comprises the steps of providing a separating apparatus comprising a rotatable hollow drum having a perforated outer surface, and an endless belt; engaging a compression belt with a portion of a hollow drum having a perforated outer surface, said belt and said hollow drum forming a wedge-shaped input zone; pressing the compression belt against the outer surface; rotating the hollow drum so that the movement of the outer surface is synchronous with the movement of the compression belt; urging the compression belt away from the outer surface within the input zone; and feeding the composition to the input zone and passing it between the compression belt and the outer surface where the components of different viscosities and/or sizes are separated.

Another aspect of the present invention involves a method for separating food components having different viscosities from a food product, comprising the steps of providing a separating apparatus comprising a rotatable hollow drum having a perforated outer surface, and an endless belt; engaging a compression belt with a portion of a hollow drum having a perforated outer surface, said belt and said hollow drum forming a wedge-shaped input zone; pressing the compression belt against the outer surface; rotating the hollow drum so that the movement of the outer surface is synchronous with the movement of the compression belt; urging the compression belt away from the outer surface within the input zone; and feeding the food product to the input zone and passing it between the compression belt and the outer surface where the food components of different viscosities are separated.

A still further aspect of the invention involves an apparatus for separating components having different viscosities from a composition, wherein said composition has a generally paste-like consistency. The apparatus comprises a rotatable hollow drum having an outer surface which is perforated, and an endless belt in engagement with a portion of the outer surface of said drum. The belt and said outer surface define an input zone where the belt and the outer surface engage. The input zone has the form of a wedge, and in use, the belt rotates synchronously with the outer surface. The apparatus further comprises an adjustable compression roller positioned to press the belt against said portion of the outer surface of the hollow drum, and a supply unit. The supply unit comprises a housing which extends into the area where the belt and the hollow drum engage. The housing having walls defining an opening directed towards said area.

A futher aspect of the invention involves a method of improving the separation of components having different viscosities and/or sizes from a composition. The method comprises the steps of providing a rotatable hollow drum having an outer surface with perforations extending therethrough; engaging a belt with a portion of the outer surface of said drum, said belt and drum forming a generally wedge-shaped input zone; rotating said drum; increasing the angle between the belt and said drum in said input zone; and feeding the composition into said input zone.

Advantageously, the disclosed embodiments of the present invention achieve the desired improvement of the processing capabilities by manipulating the geometry of the input zone, whereas the process of compression is not disturbed.

BRIEF DESCRIPTION OF THE DRAWINGS

Further advantages and embodiments of the present invention will be apparent from the following description and claims and are illustrated in the accompanying drawings, by way of illustration, schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 1 is a perspective overview of the separating apparatus including its functional parts;

FIG. 2 is a side view of the separating apparatus according to FIG. 1;

DETAILED DESCRIPTION OF THE PREFERRED EMBODIMENT

Figure 3:
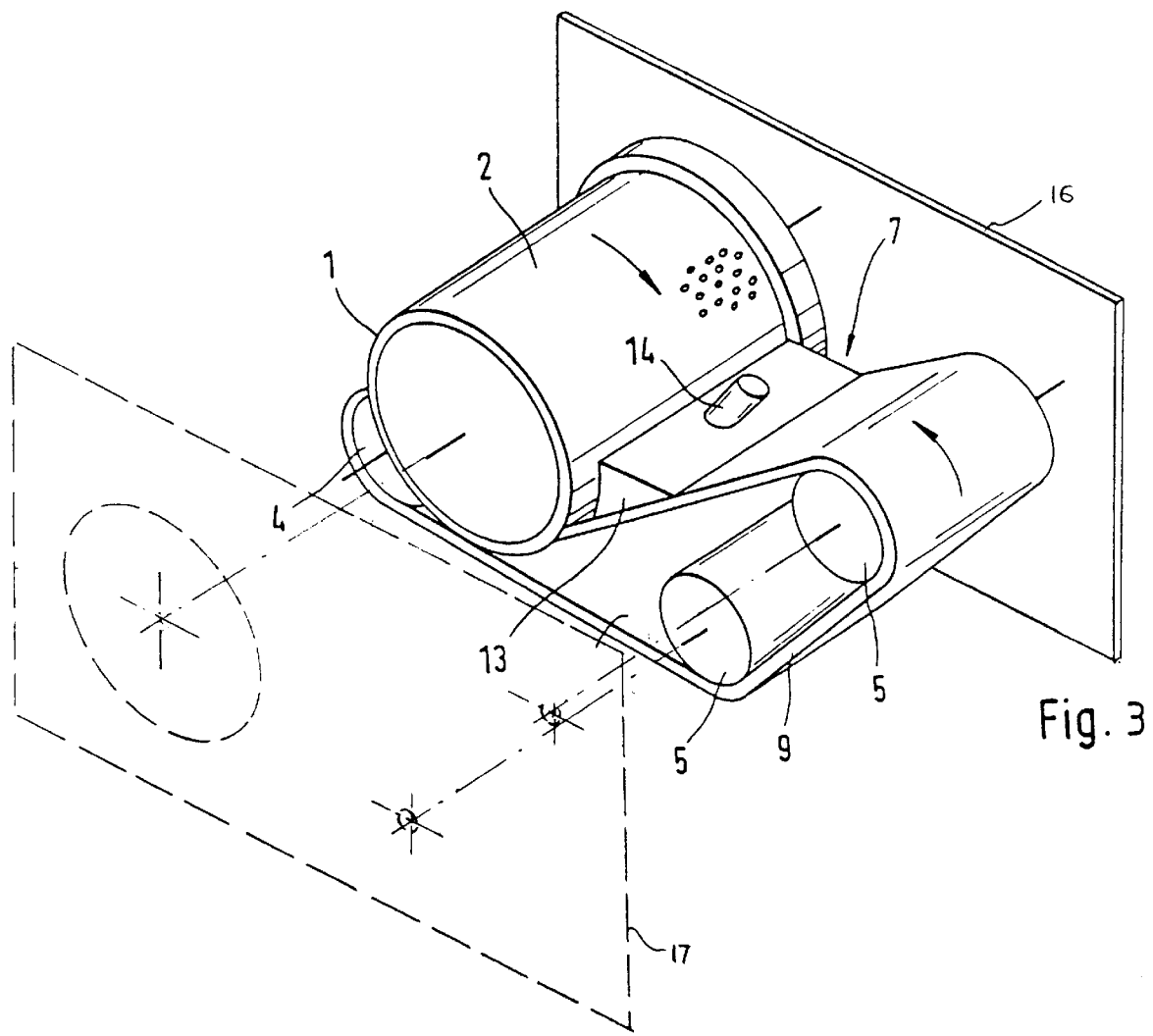
FIG. 3 is an overview of the functional parts of the separating apparatus including feeding device.

In FIG. 1, the separating apparatus according to the present invention, for reasons of clarity shown without a frame, comprises a hollow drum 1, an endless compression belt 3, an adjustable compression roller 4 and two deflection rollers 5, all mounted in side walls which are not shown. The hollow drum 1 is cylindrical, has a longitudinal axis 20 and is open on one side. The hollow drum 1 has an outer surface 2 which is perforated. The endless compression belt 3 is wrapped around the compression roller 4 and the two deflection rollers 5 so that its upper side faces the outer surface 2 and its inner side faces the rollers 4, 5. The compression belt 3 is guided between the side walls of the separating apparatus and partly embraces the hollow drum 1. The compression roller 4 in combination with one of the deflection rollers 5 presses the compression belt 3 against the portion of the outer surface 2 that is engaged by the compression belt 3. The compression belt 3 and the outer surface 2 define an input zone 6 where the compression belt 3 and the outer surface 2 engage. The input zone 6 has the form of a wedge. In use, the wedge-shaped input zone 6 receives the goods which the compression belt 3 transports under the outer surface 2 of the hollow drum 1.

The separating apparatus preferably includes a motor 21 which communicates with the hollow drum 1, e.g., via the axis 20. The motor 21 drives the hollow drum 1 so that it rotates around the axis 20. In FIG. 1, the motor 21 is schematically illustrated and positioned in proximity of one side of the hollow drum 1. Those skilled in the art will appreciate that the motor 21 can be positioned at other locations closer or farther to the drum 1. A further motor (not shown) may be used to drive one or more rollers 4, 5. As indicated by arrows in FIG. 1, the hollow drum 1 and the rollers 4, 5 are counter-rotating.

Within the input zone 6, the separating apparatus comprises a device, subsequently referred to as diverter 7, which urges the compression belt 3 away from the outer surface 2 of the hollow drum 1. In the illustrated embodiment, the diverter 7 includes skids 8, preferably a pair of skids 8. Each skid 8 is wedge-shaped and attached to the frame. The skids 8 are spaced apart, preferably at a distance sufficiently long to guide the compression belt 3 within zones limited by belt edges 9. With its upper side facing the hollow drum 1, the compression belt 3 is guided by the wedge-shaped skids 8 which extend into the area where the compression belt 3 and the outer surface 2 of the hollow drum 1 engage.

The skids 8 comprise a material which is low in friction and wear, e.g., high molecular weight polyethylene. As best seen in FIG. 2, the skids 8 have a front edge 10 which is adapted to the curvature of the hollow drum 1, and an arcuate front edge 11 which faces the compression belt 3. The front edges 10, 11 form a wedge-like shape in the area of where the compression belt 3 and the outer surface 2 meet. At their up-facing contour, the skids 8 each have a recess 12.

The skids 8 urge the compression belt 3 away from the hollow drum 1, resulting in a wedge caused by the curvature of the outer surface 2 and the compression belt 3 which is less steep. That is, by urging the compression belt 3 away from the hollow drum 1, the angle between the compression belt 3 and the hollow drum 1 is increased. Through this increase of the angle, the input capability of the separating apparatus, particularly for processing of bulky goods, is improved. The field of use of separating apparatuses of the type consisting of a compression belt and a hollow drum can thereby be extended to strained goods, which, according to the prior art, required pre-processing, e.g., pre-chopping.

Figure 4:
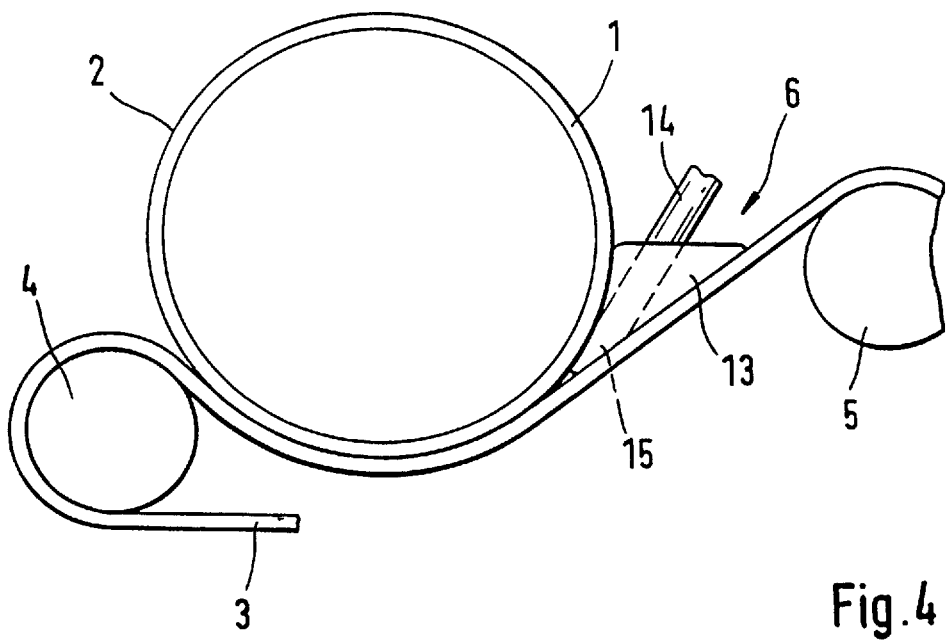
FIG. 4 is a side view of a part of the separating apparatus according to FIG. 3.

A further embodiment of a separating apparatus according to the present invention is shown in FIGS. 3 and 4 wherein components already mentioned in FIG. 1 have been identified by the same reference numerals. Similar to the separating apparatus shown in FIG. 1, the separating apparatus comprises a hollow drum 1 with a perforated outer surface 2, an endless compression belt 3, an adjustable compression roller 4 and two deflection rollers 5. The compression belt 3 is guided between side walls 16, 17, and partly engages the hollow drum 1. The compression roller 4 presses the compression belt 3 against the outer surface 2. Together with the hollow drum 1, the compression belt 3 forms a wedge-shaped input zone 6. Within the input zone 6, a supply unit 13 is positioned to feed a composition to the outer surface 2.

The supply unit 13 is formed substantially as a wedge-shaped feeding unit. The feeding unit comprises a tubular feeding device 14 which feeds the composition directly to the gap between the compression belts 3 and the outer surface 2. The composition leaves the feeding device 14 through an opening 15. Because of its adaptation to the geometry of the hollow drum 1, it is achieved that the composition is output under a defined pressure.

Figure 5:
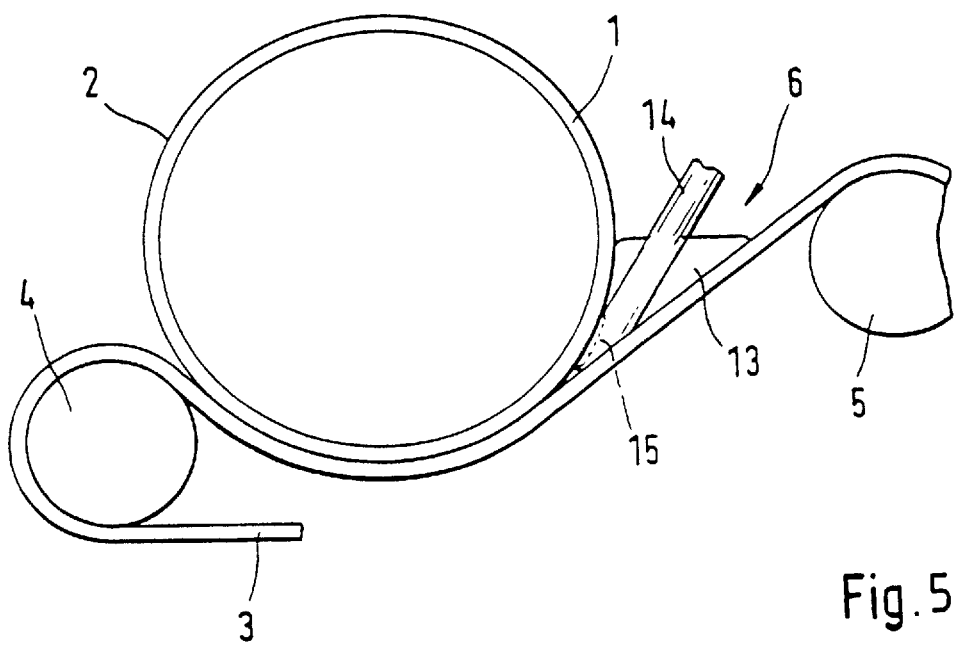
FIG. 5 is a side view of the separating apparatus including a further embodiment of a feeding device.

FIG. 5 shows a side view of the separating apparatus described above which includes a further embodiment of a feeding device 14. The feeding device 14 extends into the wedge-shaped input zone 6 between the skids 8 shown in FIG. 1. The opening 15 has the form of a nozzle. As the nozzle geometry of the opening 15 is adapted to the from of the outer surface 2, it is possible to output the compound under a defined pressure.

Figure 6:
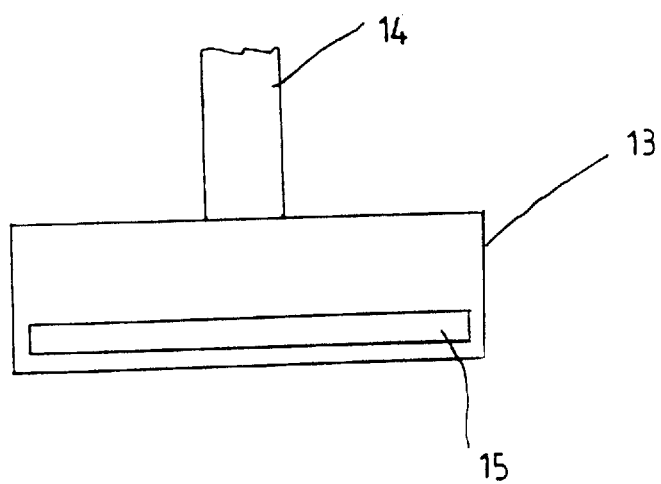
FIG. 6 is a simplified illustration of a feeding device.

FIG. 6 shows a simplified embodiment of a supply unit 13 for feeding a composition to the outer surface 2 (FIG. 5). As shown in FIG. 5 and described above, the supply unit 13 is positioned within the input zone 5. The supply unit 13 comprises the tubular feeding device 14 and the nozzle-shaped opening 15. The nozzle-shaped opening 15 has a width which is adapted to extend approximately over the width of the compression belt 3 so that even distribution of the goods to the compression belt 3 is achieved.

The described and illustrated separating apparatus allows processing of a variety of different goods, such as bulky or pasty goods. Depending on the kind of goods and the desired quality of the final product, different hollow drums having different perforations can be selected; e.g., the perforations may be 1.3, 2, 3, 5, 8 or 10 millimeters. For processing fruits and vegetables, perforations of 1.3 mm or 3 mm are preferred. In use, the hollow drum rotates at about 30–50 rounds per minute depending on the kind of goods, and preferably is made of stainless and food compatible steel, such as V2A steel.

Preferably, the compression belt is made of highly elastic materials, such as neoprene or polyurethane. The pressure at which the compression belt is pressed against the hollow drum can be adjusted by the compression roller and also depends on the kind of goods to be processed.

What is claimed is:

1. An apparatus for separating components having different viscosities and/or size from a composition, said apparatus comprising:

a rotatable hollow drum having an outer surface, the outer surface being perforated;

an endless belt in engagement with a portion of the outer surface of said drum, said belt and said outer surface defining between them, where the belt and the outer surface engage, a zone to input said composition into said apparatus for said separating, said input zone having a generally wedge-shaped cross section;

a compression roller positioned to press the belt against said portion of the outer surface of the hollow drum; and a device positioned within the input zone, said device tending to urge the belt away from said outer surface.

2. The apparatus of claim 1, wherein the device includes wedge-shaped skids extending into the area where the compression belt engages the drum.

3. The apparatus of claim 2, wherein the device includes a pair of wedge-shaped skids.

4. The apparatus of claim 3, wherein the pair of skids is positioned to guide the compression belt having a preset width at a distance of less than the width of the belt.

5. The apparatus of claim 2, wherein the skids comprise a material which is low in friction and wear.

6. The apparatus of claim 5, wherein the material comprises polyethylene.

7. The apparatus of claim 2, wherein each skid comprises a first front edge, which is adapted to the curvature of the hollow drum, and an arcuate second front edge facing the belt and urging the belt away from the outer surface, said first and second front edges merging to form a wedge-like shape.

8. The apparatus of claim 1, wherein the device includes wedge-shaped skids which extend into the area where the compression belt engages the hollow drum, said skids being positioned at a distance of less than the width of the belt, the device further including a housing having at least one opening.

9. The apparatus of claim 8, wherein the skids comprise a material which is low in friction and wear.

10. The apparatus of claim 9, wherein the material comprises polyethylene.

11. The apparatus of claim 8, wherein each skid has a first front edge which is adapted to the curvature of the hollow drum, and an arcuate second front edge faces the belt and urges the belt away from the outer surface, said first and second front edges wedge-like.

12. The apparatus of claim 1, wherein the compression roller is adjustable to vary the amount of said compression.

13. An apparatus for separating components having different viscosities and/or sizes from a composition, said apparatus comprising:

a rotatable hollow drum having an outer surface, the outer surface being perforated;

an endless belt in engagement with a portion of the outer surface of said drum, said belt and said outer surface defining an input zone where the belt and the outer surface engage, said input zone having the form of a wedge;

a compression roller positioned to press the belt against said portion of the outer surface of the hollow drum; and a unit for supplying said composition under pressure to said input zone, said supply unit comprising a housing which extends into an area of the input zone where the belt and the hollow drum engage to discharge material into said area, said housing having walls defining an opening directed towards said area to define a nozzle shaped opening to discharge said material into the area of the input zone where the belt and the hollow drum engage.

14. The apparatus of claim 13, wherein the housing has a generally wedge-like shape.

15. The apparatus of claim 13, wherein the opening has a generally slot-like shape.

16. The apparatus of claim 13, further comprising a supply tube extending into the housing and communicating with the opening.

17. The apparatus of claim 14, wherein the opening has a generally nozzle-like shape.

18. The apparatus of claim 17, wherein the nozzle-shaped opening of the feeding unit generally corresponds to the curvature of the hollow drum.

19. A method for separating components having different viscosities and/or size from a composition, comprising the steps of:

providing a separating apparatus comprising a rotatable hollow drum having a perforated outer surface, and an endless belt;

engaging said belt with a portion of a hollow drum having a perforated outer surface, said belt and said hollow drum forming a wedge-shaped input zone;

pressing the belt against the outer surface;

rotating the hollow drum so that the movement of the outer surface is substantially synchronous with the movement of the belt;

urging the belt away from the outer surface within the input zone; and feeding the composition to the input zone and passing it between the belt and the outer surface where the components of different viscosities and/or sizes tend to be separated.

20. The method of claim 19, further comprising the steps of positioning a wedge-shaped skids within the input zone, each skid being adapted to the curvature of the hollow drum, thereby urging the compression belt away from the outer surface.

21. The method of claim 19, wherein a pair of wedge-shaped skids is placed within the input zone.

22. A method for separating food components having different viscosities and/or size from a food product, comprising the steps of:

providing a separating apparatus comprising a rotatable hollow drum having a perforated outer surface, and an endless belt;

engaging said belt with a portion of a hollow drum having a perforated outer surface, said belt and said hollow drum forming a wedge-shaped input zone;

pressing the belt against the outer surface;

rotating the hollow drum so that the movement of the outer surface is substantially synchronous with the movement of the belt;

urging the belt away from the outer surface within the input zone; and feeding the food product to the input zone and passing it between the belt and the outer surface where the food components of different viscosities and/or sizes tend to be separated.

23. An apparatus for separating components having different viscosities from a composition, said apparatus comprising:

a rotatable hollow drum having an outer surface, the outer surface being perforated;

an endless belt in engagement with a portion of the outer surface of said drum, said belt and said outer surface defining an input zone where the belt and the outer surface engage, said input zone having the form of a wedge;

a compression roller positioned to press the belt against said portion of the outer surface of the hollow drum; and a unit for supplying said composition under pressure to said input zone, said supply unit comprising a housing which extends into an area of the input zone where the belt and the hollow drum engage, said housing having walls defining a generally nozzle-like shaped opening generally corresponding to the curvature of the hollow drum with the opening directed towards said area.

24. A method of improving the separation of components having different viscosities and/or sizes from a composition, said method comprising the steps of:

providing a rotatable hollow drum having an outer surface with perforations extending therethrough;

engaging a belt with a portion of the outer surface of said drum, said belt and drum forming a generally wedge-shaped input zone;

rotating said drum;

creating and maintaining an increased angle between the belt and said drum in said input zone; and feeding the composition into said input zone.

25. An apparatus for separating components having different viscosities and/or sizes from a composition, said apparatus comprising:

a rotatable hollow drum having an outer surface, the outer surface being perforated;

an endless belt in engagement with a portion of the outer surface of said drum, said belt and said outer surface defining an input zone where the belt and the outer surface engage, said input zone having the form of a wedge;

a compression roller positioned to press the belt against said portion of the outer surface of the hollow drum; and a unit for supplying said composition to said input zone, said supply unit comprising a housing which extends into an area of the input zone where the belt and the hollow drum engage, said housing having walls defining an opening directed towards said area, and a supply tube extending into the housing and communicating with said opening.

26. The apparatus of claim 25, wherein the opening has a generally nozzle-like shape.

27. The apparatus of claim 26, wherein the nozzle-shaped opening generally corresponds to the curvature of the hollow drum, and a supply tube extending into the housing and communicating with said opening.

* * * * *